US012683197B2

(12) United States Patent
Tang et al.

(10) Patent No.: US 12,683,197 B2
(45) Date of Patent: Jul. 14, 2026

(54) SYSTEM AND METHOD FOR WAKE-UP CONTROL OF PARALLEL BATTERY PACKS

(71) Applicant: NINGDE AMPEREX TECHNOLOGY LIMITED, Ningde City (CN)

(72) Inventors: Haoming Tang, Dongguan City (CN); Wanjia Wang, Dongguan City (CN); Jianping Zhang, Dongguan City (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 739 days.

(21) Appl. No.: 18/093,427

(22) Filed: Jan. 5, 2023

(65) Prior Publication Data

US 2023/0145542 A1 May 11, 2023

Related U.S. Application Data

(63) Continuation of application No. PCT/CN2020/101064, filed on Jul. 9, 2020.

(51) Int. Cl.
*H01M 10/42* (2006.01)
*H02J 7/50* (2026.01)

(52) U.S. Cl.
CPC ............. *H01M 10/425* (2013.01); *H02J 7/50* (2026.01); *H01M 2010/4271* (2013.01)

(58) Field of Classification Search
CPC .................................................... H02J 7/0013
See application file for complete search history.

(56) References Cited

U.S. PATENT DOCUMENTS 5,825,155 A   10/1998 Ito et al.
9,840,151 B2  12/2017 Momo et al.
(Continued)

FOREIGN PATENT DOCUMENTS

CN        1606189 A      4/2005
CN        2746630 Y     12/2005
(Continued)

OTHER PUBLICATIONS

CN210075070_Translation (Year: 2020).*
(Continued)

*Primary Examiner* — Tynese V Mcdaniel
(74) *Attorney, Agent, or Firm* — WHDA, LLP

(57) ABSTRACT

A system for wake-up control of parallel battery packs includes a first battery pack and a second battery pack connected in parallel. The first battery pack includes a first control unit, and the second battery pack includes a second control unit. The first battery pack is configured to receive a first trigger signal to wake up the first control unit. The first control unit of the first battery pack is configured to output a first driving signal after being woken up. The second battery pack is configured to receive a second driving signal sent from the first battery pack, and transmit the processed second driving signal to the second control unit of the second battery pack, to wake up the second control unit of the second battery pack. The second driving signal is output after the first driving signal is processed by the first battery pack.

10 Claims, 4 Drawing Sheets

(56)    References Cited

U.S. PATENT DOCUMENTS

| | | | |
|---|---|---|---|
| 2004/0164706 A1 | 8/2004 | Osborne | |
| 2006/0139005 A1 | 6/2006 | Niculae et al. | |
| 2008/0018300 A1* | 1/2008 | Zaag | B60L 3/04 |
| | | | 320/118 |
| 2009/0102424 A1* | 4/2009 | Tien | H02J 7/0014 |
| | | | 320/124 |
| 2011/0006731 A1 | 1/2011 | Wang et al. | |
| 2011/0298424 A1 | 12/2011 | Yamauchi et al. | |
| 2014/0091770 A1* | 4/2014 | Lee | H02J 7/04 |
| | | | 320/135 |
| 2014/0203780 A1 | 7/2014 | Hu et al. | |
| 2017/0038809 A1* | 2/2017 | Huang | G06F 1/263 |
| 2017/0297448 A1 | 10/2017 | Sufrin-Disler et al. | |
| 2019/0052109 A1* | 2/2019 | Sturnfield | H02J 7/34 |
| 2019/0152342 A1* | 5/2019 | Shen | B60L 50/64 |
| 2019/0283626 A1 | 9/2019 | Staudenmaier | |
| 2020/0006955 A1* | 1/2020 | Cai | H01M 10/425 |
| 2020/0006961 A1* | 1/2020 | Zhou | H02J 7/0013 |
| 2025/0132405 A1* | 4/2025 | Huang | H01M 10/48 |

FOREIGN PATENT DOCUMENTS

| | | |
|---|---|---|
| CN | 201956440 U | 8/2011 |
| CN | 203398797 U | 1/2014 |
| CN | 204928285 U | 12/2015 |
| CN | 206850457 U | 1/2018 |
| CN | 107968232 A | 4/2018 |
| CN | 108767946 A | 11/2018 |
| CN | 208782521 U | 4/2019 |
| CN | 109742831 A | 5/2019 |
| CN | 110190868 A | 8/2019 |
| CN | 210075070 U * | 2/2020 |
| CN | 110890776 A | 3/2020 |
| JP | 2015-507451 A | 3/2015 |
| JP | 2022-545034 A | 10/2022 |

OTHER PUBLICATIONS

International Search Report dated Mar. 25, 2021, issued in counterpart Application No. PCT/CN2020/101064, with English translation. (7 pages).

Office Action dated Feb. 25, 2022, issued in counterpart AU Application No. 2020372600. (6 pages).

Office Action dated Aug. 10, 2022, issued in counterpart AU Application No. 2020372600. (4 pages).

Office Action dated Sep. 26, 2021, issued in counterpart CN Application No. 202080001248.3. (11 pages).

Notice of Allowance dated Apr. 6, 2022, issued in counterpart CN Application No. 202080001248.3. (6 pages).

Extended (Supplementary) European Search Report dated Oct. 21, 2021, issued in counterpart EP Application No. 20866947.3. (6 pages).

Office Action dated Nov. 1, 2022, issued in counterpart JP Application No. 2021-517610. (2 pages).

* cited by examiner

100

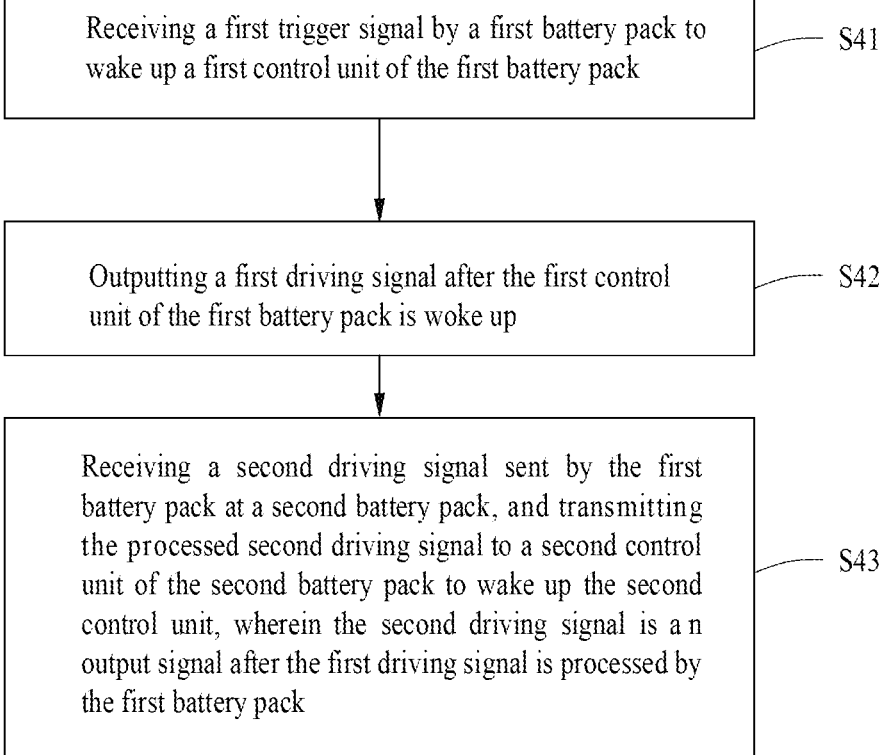

Receiving a first trigger signal by a first battery pack to wake up a first control unit of the first battery pack — S41

Outputting a first driving signal after the first control unit of the first battery pack is woke up — S42

Receiving a second driving signal sent by the first battery pack at a second battery pack, and transmitting the processed second driving signal to a second control unit of the second battery pack to wake up the second control unit, wherein the second driving signal is a n output signal after the first driving signal is processed by the first battery pack — S43

FIG. 4

SYSTEM AND METHOD FOR WAKE-UP CONTROL OF PARALLEL BATTERY PACKS

CROSS REFERENCE TO THE RELATED APPLICATIONS

The present application is a continuation application of International Application No. PCT/CN2020/101064, filed on 9 Jul. 2020, the disclosure of which is hereby incorporated by reference in its entirety.

TECHNICAL FIELD

The present application relates to the field of battery technology, and in particular to a system and method for wake-up control of parallel battery packs.

BACKGROUND

In order to response to the increase of user demands for the power and battery life of energy storage batteries, if the solution of a single battery pack is still adopted, it is bound to increase an energy density and a cell capacity of a battery pack cell. As a result, the volume and weight of the battery pack are increased, and research and development, manufacturing, transportation and installation costs of the battery pack are also increased. If the solution of parallel battery packs is adopted, from the perspective of research and development, only a low-capacity solution needs to be designed, which reduces the research and development and safety certification costs of a developer.

At present, the wake-up manner for an existing energy storage system is that the output of a power terminal of a multilevel parallel system energy storage inverter (PCS) is transmitted to PACK+ and PACK− terminals of power lines of a stand-alone system connected thereto, and after detecting the output of the PACK terminals, an activation circuit of the PACK system per se activates its own PACK system, or the system is activated step by step through physical buttons of the system per se. Such a wake-up manner is simple, reliable, and easy to implement, and is widely applied to a multi-machine parallel system of an energy storage power station.

However, in the prior art, under the condition that multiple groups of PACKs are used in parallel, the manner of using the output of the PACK power terminals to wake up other PACKs can only be used for the wake-up in the case of no detection at a load terminal. When the PCS on the load terminal performs normal output only after detecting the PACK state, the application scenario cannot be satisfied. In addition, if the load output terminal has a fault, the wake-up through the power lines may easily cause device burnout or equipment damage. Besides, the wake-up manner through single PACK physical buttons is cumbersome in operation and not convenient enough.

SUMMARY

In view of the foregoing, it is necessary to provide a system and method for wake-up control of parallel battery packs, which have functional safety requirements, convenience in operation, and improved user experience.

An embodiment of the present application provides a system for wake-up control of parallel battery packs, which includes a first battery pack and a second battery pack which connected in parallel. The first battery pack includes a first control unit, and the second battery pack includes a second control unit.

The first battery pack is configured to receive a first trigger signal to wake up the first control unit of the first battery pack.

The first control unit of the first battery pack is configured to output a first driving signal after being woken up.

The second battery pack is configured to receive a second driving signal sent by the first battery pack, and transmit the processed second driving signal to the second control unit of the second battery pack to wake up the second control unit of the second battery pack, wherein the second driving signal is an output signal after that the first driving signal is processed by the first battery pack.

According to some embodiments of the present application, the first battery pack further includes: a first signal processing unit, including a first driving module, a first isolation element, and a first processing module and the first processing module is configured to process the first driving signal to generate the second driving signal.

According to some embodiments of the present application, the first driving module is electrically connected between the first control unit and the first isolation element, the first processing module is electrically connected to the first isolation element, the first driving module is configured to receive the first driving signal, drive and amplify the first driving signal and then turn on the first isolation element, and the first isolation element is configured to control the first processing module to output the second driving signal after being turned on.

According to some embodiments of the present application, the second battery pack further includes: a second signal processing unit including a second driving module, a second processing module, and a second isolation element, wherein the second driving module is configured to receive the second driving signal and control the second isolation element to be turned on according to the second driving signal, the second isolation element is configured to output a voltage signal to the second processing module after being turned on, and the second processing module is configured to wake up the second control unit of the second battery pack after receiving the voltage signal.

According to some embodiments of the present application, the first driving module includes a first switch, a first terminal of the first switch is electrically connected to the first control unit, a second terminal of the first switch is grounded, and a third terminal of the first switch is electrically connected to the first isolation element.

According to some embodiments of the present application, the first isolation element includes a first light-emitting unit and a first switch unit, the first switch unit includes an emitting electrode and a collecting electrode, a first terminal of the first light-emitting unit is electrically connected to the third terminal of the first switch, a second terminal of the first light-emitting unit is electrically connected to the first control unit, the emitting electrode of the first switch unit is grounded, and the collecting electrode of the first switch unit is electrically connected to the first processing module.

According to some embodiments of the present application, the first processing module includes a second switch, a first terminal of the second switch is electrically connected to the collecting electrode of the first switch unit, a second terminal of the second switch is electrically connected to a power supply, and a third terminal of the second switch outputs the second driving signal.

According to some embodiments of the present application, the second driving module includes a diode, an anode of the diode is electrically connected to the third terminal of the second switch, a cathode of the diode is electrically connected to the second isolation element.

According to some embodiments of the present application, the second isolation element includes the second light-emitting unit and the second switch unit, the second switch unit includes the emitting electrode and the collecting electrode, a first terminal of the second light-emitting unit is electrically connected to the cathode of the diode, the second terminal of the second light-emitting unit is grounded, and the emitting electrode and collecting electrode of the second switch unit are electrically connected to the second processing module.

According to some embodiments of the present application, the first switch is an NPN type triode, the second switch is a PNP type triode, the first terminal, the second terminal and the third terminal of the first switch respectively correspond to a base electrode, an emitting electrode, and a collecting electrode of the NPN type triode, and the first terminal, the second terminal, and the third terminal of the second switch respectively correspond to a base electrode, an emitting electrode and a collecting electrode of the PNP type triode.

An embodiment of the present application also provides a method for wake-up control of parallel battery packs. The method includes:

receiving a first trigger signal by a first battery pack to wake up a first control unit of the first battery pack;

outputting a first driving signal after the first control unit of the first battery pack is woken up; and receiving a second driving signal sent by the first battery pack at a second battery pack, and transmitting the processed second driving signal to a second control unit of the second battery pack to wake up the second control unit of the second battery pack, wherein the second driving signal is an output signal after that the first driving signal is processed by the first battery pack.

According to some embodiments of the present application, the method for wake-up control of parallel battery packs further includes: receiving the first driving signal by a first driving module, driving and amplifying the first driving signal and then turning on a first isolation element; and controlling a first processing module to output the second driving signal after the first isolation element is turned on, wherein the first driving module is electrically connected between the first control unit and the first isolation element, and the first processing module is electrically connected to the first isolation element.

According to some embodiments of the present application, the method for wake-up control of parallel battery packs further includes: receiving the second driving signal by a second driving module, and controlling a second isolation element to be turned on according to the second driving signal; outputting a voltage signal to a second processing module after the second isolation element is turned on; and waking up the second control unit of the second battery pack after the second processing module receives the voltage signal.

In the system and method for wake-up control of parallel battery packs according to the embodiments of the present application, wake-up signal lines of a plurality of battery packs are connected in parallel, the first control unit of one of first battery packs is woken up by the first trigger signal, and the second driving signal is output to the second battery pack. The second battery pack processes the second driving signal and then transmits the processed second driving signal to the second control unit of the second battery pack to wake up the second control unit of the second battery pack. In this way, the system for wake-up control of parallel battery packs according to the embodiment of the present application can significantly improve the operation convenience feeling of a user for a product, bring a better experience to the user, and solve the problem that the PCS terminal is abnormal or an application environment of interactive operation is required through a simple and reliable circuit design. Therefore, the product is wider in application range and has greater adaptability.

BRIEF DESCRIPTION OF DRAWINGS

FIG. 4 is a flowchart of a method for wake-up control of parallel battery packs according to an embodiment of the present application.

REFERENCE SIGNS OF MAIN ELEMENTS

Figure 1:
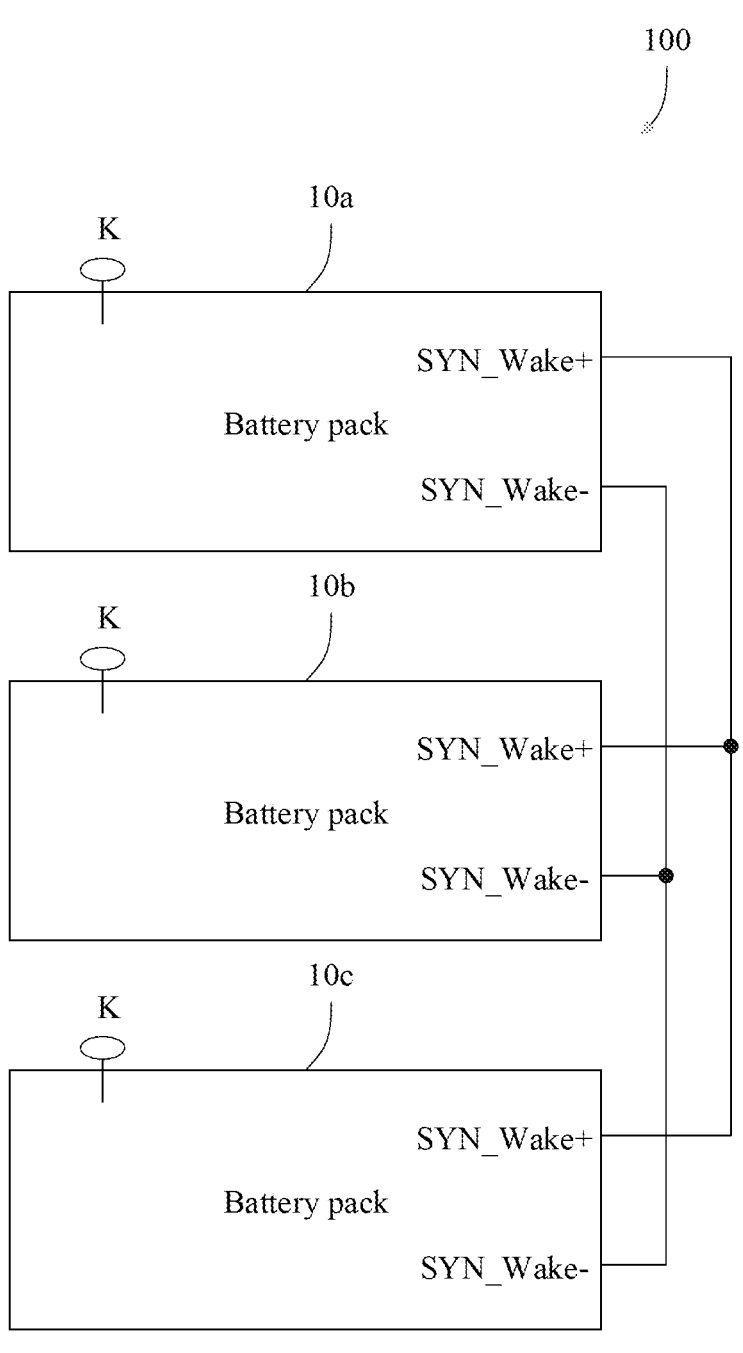
FIG. 1 is a schematic diagram of an electrochemical apparatus according to an embodiment of the present application.

System for wake-up control of parallel battery packs 100
Battery pack 10*a*, 10*b* and 10*c*
Control unit 21
Signal processing unit 22
First driving module 23
First processing module 24
Second driving module 25
Second processing module 26
First isolation element U1
Second isolation element U2
First switch Q1
Second switch Q2
First to fourteenth resistors R1-R14
First to fourth capacitors C1-C4
Diode D1
The following specific embodiments will describe the present application in more detail in conjunction with above-mentioned accompanying drawings.

DETAILED DESCRIPTION OF EMBODIMENTS

The following clearly and fully describes the technical solutions in the embodiments of the present application in conjunction with the accompanying drawings in the embodiments of the present application. Apparently, the described embodiments are merely a part of but not all of the embodiments of the present application.

Please refer to FIG. 1, which is a system architecture schematic diagram of a parallel operation performed according to a system for wake-up control of parallel battery packs 100 according to an embodiment of the present application. The system for wake-up control 100 in the embodiment of the present application may include the parallel battery packs.

The parallel battery packs in the embodiment of the present application may include a plurality of battery packs connected in parallel (FIG. 1 only uses three battery packs 10*a*, 10*b* and 10*c* as an example for illustration, and there may be more than three or less than three battery packs).

That is, the plurality of battery packs are connected in parallel to form the system for wake-up control of parallel battery packs 100.

Each of the battery packs 10a, 10b and 10c is connected in parallel by wake-up lines SYN_Wake+ and SYN_Wake–. For example, a SYN_Wake+ terminal of the battery pack 10a is connected to SYN_Wake+ terminals of the battery pack 10b and the battery pack 10c, and a SYN_Wake– terminal of the battery pack 10a is connected to SYN_Wake– terminals of the battery pack 10b and the battery pack 10c.

In the embodiment of the present application, each of the battery packs 10a, 10b and 10c is further provided with a trigger module K, that is, each of the battery packs 10a, 10b and 10c is correspondingly electrically connected to one trigger module K. In a embodiment of the present application, the trigger module K may include a key switch, and the trigger module K is configured to output a trigger signal under a trigger condition. When the trigger module K on one of the plurality of battery packs 10a, 10b and 10c is triggered, the battery pack enters a wake-up state. For example, when the trigger module K on the battery pack 10a is triggered, the battery pack 10 is woken up to enter a working state.

Specifically, in the embodiment of the present application, a key switch and a voltage divider resistor may be connected in series between a positive terminal and a negative terminal of the battery pack, and a filter capacitor may be connected in parallel at a switch terminal to eliminate a spike voltage. A resistance value of the voltage divider resistor is between 100K-1 M, and a system voltage is 42-58V. Therefore, when the energy storage system is in an initial state or after the energy storage system enters a dormant state after a long-term standby, the key switch is pressed to form a loop at a key terminal, and a voltage divider resistor terminal outputs a voltage signal to the enabling terminal of a system power supply, so that the control system enters a normal working state. Therefore, when one of the plurality of battery packs 10a, 10b and 10c is activated, the remaining battery packs will be automatically woken up.

Figure 2:
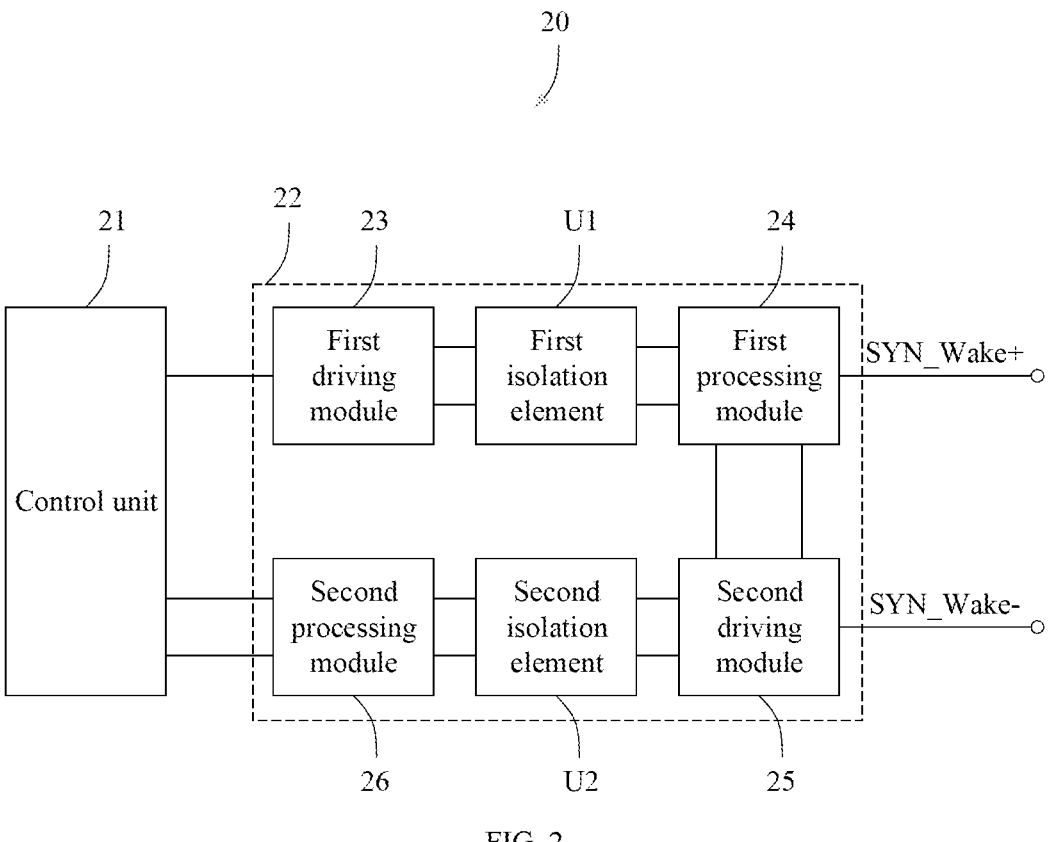
FIG. 2 is a block diagram of a signal processing unit of a battery pack in FIG. 1.

Please refer to FIG. 2, the plurality of battery packs 10a, 10b and 10c respectively include a control unit 21 and a signal processing unit 22.

In the embodiment of the present application, the battery pack 10a may serve as a first battery pack, that is, the control unit 21 in the battery pack 10a may serve as a first control unit, and the signal processing unit 22 in the battery pack 10a may serve as a first signal processing unit. Each of the battery packs 10b and 10c may serve as a second battery pack, each of the control units 21 in the battery packs 10b and 10c may serve as a second control unit, and each of the signal processing units 22 in the battery packs 10b and 10c may serve as a second signal processing unit.

It is understandable that in other embodiments, the battery pack 10b may also serve as the first battery pack, that is, the control unit 21 in the battery pack 10b may serve as the first control unit, and the signal processing unit 22 in the battery pack 10b may serve as the first signal processing unit. Each of the battery packs 10a and 10c may serve as the second battery pack, each of the control units 21 in the battery packs 10a and 10c may serve as the second control unit, and each of the signal processing units 22 in the battery packs 10a and 10c may serve as the second signal processing unit. Or the battery pack 10c serves as the first battery pack, that is, the control unit 21 in the battery pack 10c serves as the first control unit, and the signal processing unit 22 in the battery pack 10c serves as the first signal processing unit. Each of the battery packs 10a and 10b serves as the second battery pack, each of the control units 21 in the battery packs 10a and 10b serves as the second control unit, and each of the signal processing units 22 in the battery packs 10a and 10b serves as the second signal processing unit, which is not specifically limited by the present application.

Specifically, the battery pack 10a is configured to receive a first trigger signal to wake up the control unit 21 of the battery pack 10a. The control unit 21 of the first battery pack 10a is configured to output a first driving signal after being woken up. The first trigger signal is a signal generated when the trigger module K on the battery pack 10a is pressed.

In the embodiment of the present application, the battery packs 10b and 10c are configured to receive a second driving signal sent by the battery pack 10a, and transmit the processed second driving signal to the control units 21 of the battery packs 10b and 10c, so as to wake up the control units 21 of the battery packs 10b and 10c. The second driving signal is an output signal after that the battery pack 10a processes the first driving signal.

The signal processing unit 22 includes a first driving module 23, a first processing module 24, and a first isolation element U1.

Specifically, in the battery pack 10a, the control unit 21 is electrically connected to the trigger module K, and the first driving module 23 is electrically connected between the control unit 21 and the first isolation element U1. The first processing module 24 is electrically connected to the first isolation element U1. When the trigger module (for example, the key switch) is triggered, the battery pack 10a receives the first trigger signal to wake up the control unit 21 in the battery pack 10a, so that the control unit 21 will detect that there are other battery packs, and will output the first driving signal to the first driving module 23 after being woken up. After the first driving signal is driven and amplified by the first driving module 23, the first isolation element U1 is turned on. Then the first isolation element U1 outputs a low-level signal to turn on the first processing module 24 after being turned on. The first processing module 24 outputs the second driving signal to the SYN_Wake+ terminals of the battery packs 10b and 10c. That is, the signal processing unit 22 in the battery pack 10a outputs the second driving signal to the battery packs 10b and 10c, so that the control units 21 in the battery packs 10b and 10c are woken up.

It is understandable that in the embodiment of the present application, an output current of the first processing module 24 may be determined by the number of parallel battery packs in the energy storage system. A driving current designed in the embodiment of the present application may be 50-100 mA.

When the battery pack 10a outputs the second driving signal to the SYN_Wake+ terminals of the battery packs 10b and 10c, the SYN_Wake+ terminals of the battery packs 10b and 10c receive the second driving signal to activate the control units 21 in the battery packs per se.

Specifically, the signal processing unit 22 may further include a second driving module 25, a second processing module 26, and a second isolation element U2. The second driving module 25 is electrically connected between the first processing module 24 and the second isolation element U2. The second processing module 26 is electrically connected between the control unit 21 and the second isolation element U2.

One side of the second isolation element U2 and the second driving module 25 form an external input signal detection circuit to perform detection of an input signal. The second driving module 25 has the characteristics of anti-reverse connection protection, current limiting protection and interference protection. The other side of the second isolation element U2 and the second processing module 26 form a system power supply input signal detection circuit. When the SYN_Wake+ terminal receives the second driving signal output by the battery pack 10*a*, the circuit on one side of the second isolation element U2 is turned on, and the other side of the second isolation element U2 is turned on therewith. Therefore, the voltage signal can be input to the second processing module 26 for processing. After receiving the voltage signal, the second processing module 26 enables the control unit of the battery pack to work.

Therefore, in the embodiment of the present application, when a plurality of battery packs are used in parallel, the wake-up lines of the plurality of battery packs are connected in parallel through a cascade wiring harness. Then any one battery pack is activated by pressing a button at first, and the battery pack starts the self-check and then outputs the first driving signal after passing the self-check. The first driving signal is an output signal after isolation and amplification, and is transmitted to the SYN_Wake+ input sides of the remaining battery packs through a parallel communication wiring harness. The remaining battery packs isolate and process the second driving signal and then input the same to respective control units to activate the power supply of the system, so that the system can work normally.

It is understandable that in the embodiment of the present application, the first isolation element U1 and the second isolation element U2 are both electrical couplers.

Figure 3:
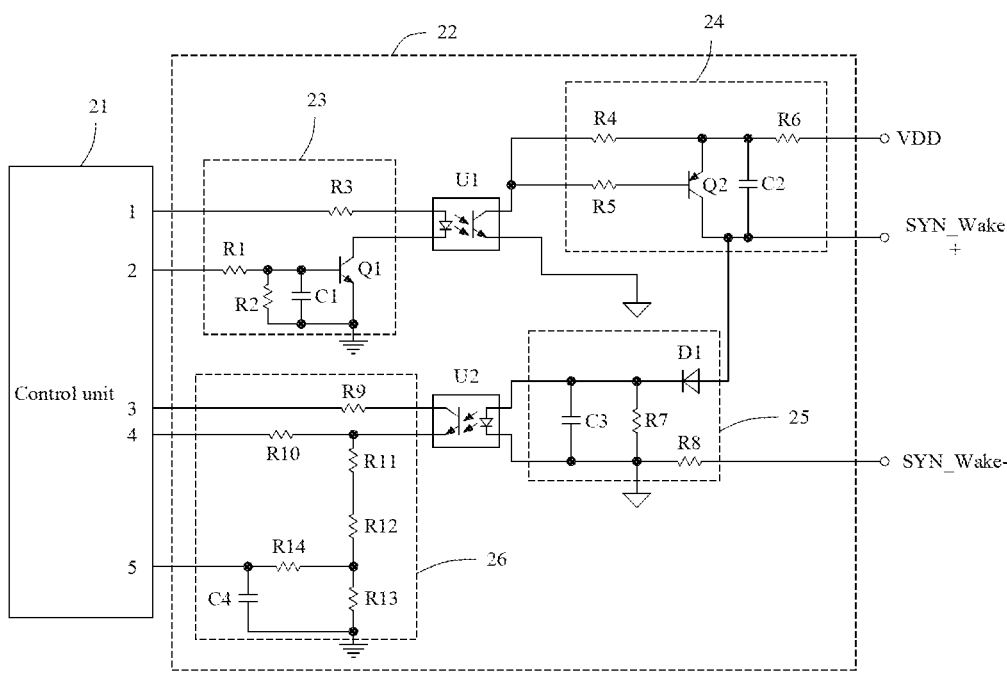
FIG. 3 is a circuit diagram of the signal processing unit of the battery pack in FIG. 1.

Please refer to FIG. 3, which is a circuit diagram of the signal processing unit 22 in a preferred embodiment of the present application.

The first driving module 23 includes a first switch Q1, a first resistor R1, a second resistor R2, a third resistor R3, and a first capacitor C1. The first isolation element U1 includes a first light-emitting unit and a first switch unit. The first switch unit includes an emitting electrode and a collecting electrode.

A first terminal of the first switch Q1 is electrically connected to a signal pin 2 of the control unit 21 through the first resistor R1, and the first terminal of the first switch Q1 is grounded through the second resistor R2. The first terminal of the first switch Q1 is also grounded through the first capacitor C1. A second terminal of the first switch Q1 is grounded, and a third terminal of the first switch Q1 is electrically connected to a first terminal of the first light-emitting unit. A second terminal of the first light-emitting unit is electrically connected to a signal pin 1 of the control unit 21 through the third resistor R3. The emitting electrode of the first switch unit is grounded, and the collecting electrode of the first switch unit is electrically connected to the first processing module 24.

In the embodiment of the present application, the first switch Q1 may be an NPN type triode, and the first terminal, the second terminal, and the third terminal of the first switch Q1 respectively correspond to a base electrode, an emitting electrode, and a collecting terminal of the NPN type triode.

The first processing module 24 includes a second switch Q2, a fourth resistor R4, a fifth resistor R5, a sixth resistor R6, and a second capacitor C2.

A first terminal of the second switch Q2 is electrically connected to the collecting electrode of the first switch unit in the first isolation element U1 through the fifth resistor R5. A second terminal of the second switch Q2 is electrically connected to the collecting electrode of the first switch unit through the four resistor R4. The second terminal of the second switch Q2 is also electrically connected to a power supply VDD through the sixth resistor R6. A third terminal of the second switch Q2 is electrically connected to the second terminal of the second switch Q2 through the second capacitor C2. The third terminal of the second switch Q2 outputs a signal to the SYN_Wake+ ports of the remaining battery packs.

It is understandable that in the embodiment of the present application, the second switch Q2 may be a PNP type triode, and the first terminal, the second terminal, and the third terminal of the second switch Q2 respectively correspond to a base electrode, an emitting electrode and a collecting electrode of the PNP type triode.

The second driving module 25 includes a diode D1, a seventh resistor R7, an eighth resistor R8, and a third capacitor C3. The second isolation element U2 includes a second light-emitting unit and a second switch unit. The second switch unit includes an emitting electrode and a collecting electrode.

An anode of the diode D1 is electrically connected to the third terminal of the second switch Q2. A cathode of the diode D1 is electrically connected to a first terminal of the second light-emitting unit. The cathode of the diode D1 is grounded through the seventh resistor R7. A second terminal of the second light-emitting unit is grounded. The first terminal of the second light-emitting unit is electrically connected to the second terminal of the second light-emitting unit through the third capacitor C3. The second terminal of the second light-emitting unit is electrically connected to the SYN_Wake− ports of the remaining battery packs through the eighth resistor R8. The emitting electrode and collecting electrode of the second switch unit are electrically connected to the second processing module 26.

The second processing module 26 includes a ninth resistor R9, a tenth resistor R10, an eleventh resistor R11, a twelfth resistor R12, a thirteenth resistor R13, a fourteenth resistor R14, and a fourth capacitor C4.

The collecting electrode of the second switch unit is electrically connected to a signal pin 3 of the control unit 21 through the ninth resistor R9, and the emitting electrode of the second switch unit is electrically connected to a signal pin 4 of the control unit 21 through the tenth resistor R10. The emitting electrode of the second switch unit is also grounded through the eleventh resistor R11, the twelfth resistor R12, and the thirteenth resistor R13 in sequence. A signal pin 5 of the control unit 21 is electrically connected to a node between the twelfth resistor R12 and the thirteenth resistor R13 through the fourteenth resistor R14, and the signal pin 5 of the control unit 21 is also grounded through the fourth capacitor C4.

The technical solution of the present application realizes the functions of automatically activating all the battery packs when a plurality of battery packs are used in parallel in the energy storage system by starting a single battery pack. The following will take the circuit diagram shown in FIG. 3 as an example to illustrate an inventive principle of the present application.

During use, when the trigger module K of any one (for example, the battery pack 10*a*) of these battery packs is pressed, that is, at this time, the battery pack 10*a* serves as the first battery pack to receive a high-level trigger signal output from the trigger module K, so that the control unit 21 in the battery pack 10*a* is woken up to start working.

Next, the battery pack 10*a* detects that there are other battery packs, and outputs the first driving signal in a high-level state to the first switch Q1. The first switch Q1 is turned on, and the first terminal of the first light-emitting element in the first isolation element U1 is grounded. The first light-emitting element is turned on, and further the first switch unit is controlled to be turned on, so that the first isolation element U1 is turned on. That is, the first driving signal is driven and amplified by the first switch Q1, and then the first isolation element U1 is turned on. The first isolation element U1 outputs a low-level signal to the second switch Q2 after being turned on. The second switch Q2 is turned on, and outputs the second driving signal to the SYN_Wake+ ports of the remaining battery packs 10b and 10c.

The SYN_Wake+ ports and SYN_Wake− ports in all battery packs 10a, 10b and 10c are connected together through an external link wiring harness. Therefore, after the SYN_Wake+ ports of the battery packs 10b and 10c receive the high-level second driving signal output by the SYN_Wake+ port of the battery pack 10a, the second light-emitting element in the second isolation elements U2 in the battery packs 10b and 10c are turned on, and further the second switch unit in the second isolation element U2 is controlled to be turned on, so that the second isolation element U2 is turned on. In this way, a voltage signal is output from one side of the second isolation element U2 and is processed by the second processing module 26, and then a SYN_wake up enable signal is output to the control units 21 in the battery packs 10b and 10c. That is, the SYN_wake up enable signal can wake up the control units 21 of the battery packs 10b and 10c to start working, so as to activate any battery pack to work. That is, all the battery packs 10a, 10b and 10c can be woken up and enter the working state by only pressing the trigger module on any battery pack.

Please refer to FIG. 4, which is a flowchart of steps of a method for wake-up control of parallel battery packs according to an embodiment of the present application. The method for wake-up control of parallel battery packs may include the following steps:

Step S41: a first battery pack receives a first trigger signal to wake up a first control unit of the first battery pack.

In the embodiment of the present application, the first battery pack is electrically connected to a trigger module. The first trigger signal may be a signal generated when the trigger module is pressed. The trigger signal may be configured to wake up the first control unit of the first battery pack.

Step S42: the control unit of the first battery pack outputs a first driving signal after being woken up.

In the embodiment of the present application, after the first battery pack receives the first trigger signal, the first control unit of the first battery pack will be woken up. Therefore, the first control unit of the first battery pack will output the first driving signal.

Step S43: a second battery pack receives a second driving signal sent by the first battery pack, and transmits the processed second driving signal to a second control unit of the second battery pack to wake up the second control unit of the second battery pack.

In the embodiment of the present application, the second driving signal is an output signal after that the first driving signal is processed by the first battery pack.

In the embodiment of the present application, the second battery pack is configured to receive the second driving signal sent by the first battery pack, and transmit the processed second driving signal to the second control of the second battery pack, so as to wake up the second control unit of the second battery pack.

Specifically, in the embodiment of the present application, the first battery pack includes a first signal processing unit.

The first signal processing unit includes a first driving module, a first isolation element, and a first processing module. The first driving module is electrically connected between the first control unit and the first isolation element. The first processing module is electrically connected to the first switch unit of the first isolation element to receive the first driving signal, and after the first driving signal is driven and amplified, the first isolation element is turned on. After the first isolation element is turned on, the first processing module is controlled to output the second driving signal.

Further, the second battery pack further includes a second signal processing unit. The second signal processing unit includes a second driving module, a second isolation element, and a second processing module. The second driving module receives the second driving signal, and controls the second isolation element to be turned on according to the second driving signal. After the second isolation element is turned on, a voltage signal is output to the second processing module. The second processing module will wake up the second control unit of the second battery pack after receiving the voltage signal.

Therefore, according to the system and method for wake-up control of parallel battery packs in the embodiments of the present application, the remaining battery packs (for example, the battery pack 10b, 10c) can be automatically woken up by connecting the wake-up signal lines of the plurality of battery packs in parallel, and by waking up one of the battery packs (for example, the battery pack 10a). In this way, the system for wake-up control of parallel battery packs according to the embodiment of the present application can significantly improve the operation convenience feeling of the user for a product, bring a better experience to the user, and solve the problem that the PCS terminal is abnormal or an application environment of interactive operation is required through a simple and reliable circuit design. Therefore, the product is wider in application range and has greater adaptability.

Those of ordinary skill in the art should realize that the above embodiments are only configured to illustrate the present application instead of limiting the present application. The appropriate changes and alterations fall within the scope of protection claimed by the present application as long as they are within the scope of the essential spirit of the present application.

What is claimed is:

1. A system for wake-up control of parallel battery packs, comprising:

a first battery pack and a second battery pack connected in parallel; wherein, the first battery pack comprises a first control unit, and the second battery pack comprises a second control unit;

the first battery pack is configured to receive a first trigger signal to wake up the first control unit;

the first control unit is configured to output a first driving signal after being woken up;

the second battery pack is configured to receive a second driving signal sent by the first battery pack, and transmit a processed second driving signal to the second control unit to wake up the second control unit, wherein the second driving signal is an output signal after the first driving signal is processed by the first battery pack; and a first signal processing unit comprising a first driving module, a first isolation element, and a first processing module and the first processing unit is configured to process the first driving signal to generate the second driving signal;

wherein the first driving module is electrically connected between the first control unit and the first isolation element, the first processing module is electrically connected to the first isolation element, the first driving module is configured to receive the first driving signal, drive and amplify the first driving signal and then turn on the first isolation element, and the first isolation element is configured to control the first processing module to output the second driving signal after being turned on.

2. The system for wake-up control of parallel battery packs according to claim 1, wherein the second battery pack further comprises:

a second signal processing unit comprising a second driving module, a second processing module and a second isolation element; wherein the second driving module is configured to receive the second driving signal and control the second isolation element to be turned on according to the second driving signal, the second isolation element is configured to output a voltage signal to the second processing module after being turned on, and the second processing module is configured to wake up the second control unit after receiving the voltage signal.

3. The system for wake-up control of parallel battery packs according to claim 2, wherein the first driving module comprises a first switch; a first terminal of the first switch is electrically connected to the first control unit, a second terminal of the first switch is grounded, and a third terminal of the first switch is electrically connected to the first isolation element.

4. The system for wake-up control of parallel battery packs according to claim 3, wherein the first isolation element comprises a first light-emitting unit and a first switch unit; the first switch unit comprises an emitting electrode and a collecting electrode, a first terminal of the first light-emitting unit is electrically connected to the third terminal of the first switch, a second terminal of the first light-emitting unit is electrically connected to the first control unit, the emitting electrode of the first switch unit is grounded, and the collecting electrode of the first switch unit is electrically connected to the first processing module.

5. The system for wake-up control of parallel battery packs according to claim 4, wherein the first processing module comprises a second switch; a first terminal of the second switch is electrically connected to the collecting electrode of the first switch unit, a second terminal of the second switch is electrically connected to a power supply, and a third terminal of the second switch outputs the second driving signal.

6. The system for wake-up control of parallel battery packs according to claim 5, wherein the second driving module comprises a diode, an anode of the diode is electrically connected to the third terminal of the second switch, a cathode of the diode is electrically connected to the second isolation element.

7. The system for wake-up control of parallel battery packs according to claim 6, wherein the second isolation element comprises the second light-emitting unit and the second switch unit, the second switch unit comprises the emitting electrode and the collecting electrode, a first terminal of the second light-emitting unit is electrically connected to the cathode of the diode, a second terminal of the second light-emitting unit is grounded, and the emitting electrode and collecting electrode of the second switch unit are electrically connected to the second processing module.

8. The system for wake-up control of parallel battery packs according to claim 5, wherein the first switch is an NPN type triode, the second switch is a PNP type triode, the first terminal, the second terminal and the third terminal of the first switch respectively correspond to a base electrode, an emitting electrode, and a collecting electrode of the NPN type triode, and the first terminal, the second terminal, and the third terminal of the second switch respectively correspond to a base electrode, an emitting electrode and a collecting electrode of the PNP type triode.

9. A method for wake-up control of parallel battery packs, comprising:

receiving a first trigger signal by a first battery pack to wake up a first control unit of the first battery pack;

outputting a first driving signal after the first control unit is woken up;

receiving the first driving signal by a first driving module, driving and amplifying the first driving signal and then turning on a first isolation element;

receiving a second driving signal sent by the first battery pack at a second battery pack, and transmitting a processed second driving signal to a second control unit of the second battery pack to wake up the second control unit, wherein the second driving signal is an output signal after the first driving signal is processed by the first battery pack; and controlling a first processing module to output the second driving signal after the first isolation element is turned on, wherein the first driving module is electrically connected between the first control unit and the first isolation element, and the first processing module is electrically connected to the first isolation element.

10. The method for wake-up control of parallel battery packs according to claim 9, further comprising:

receiving the second driving signal by a second driving module, and controlling a second isolation element to be turned on according to the second driving signal;

outputting a voltage signal to a second processing module after the second isolation element is turned on; and waking up the second control unit of the second battery pack after the second processing module receives the voltage signal.

* * * * *